United States Patent
Tamura

(10) Patent No.: US 9,349,161 B2
(45) Date of Patent: May 24, 2016

(54) IMAGE PROCESSING APPARATUS AND IMAGE PROCESSING METHOD WITH EDGE ENHANCEMENT

(71) Applicant: CANON KABUSHIKI KAISHA, Tokyo (JP)

(72) Inventor: Hirokazu Tamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 13/930,226

(22) Filed: Jun. 28, 2013

(65) Prior Publication Data

US 2014/0023268 A1      Jan. 23, 2014

(30) Foreign Application Priority Data

Jul. 23, 2012   (JP) ................................. 2012-163073

(51) Int. Cl.
G06K 9/40      (2006.01)
G06T 5/00      (2006.01)
G06T 5/20      (2006.01)

(52) U.S. Cl.
CPC ................. *G06T 5/001* (2013.01); *G06T 5/003* (2013.01); *G06T 5/20* (2013.01); *G06T 2207/10008* (2013.01); *G06T 2207/10024* (2013.01); *G06T 2207/20192* (2013.01); *G06T 2207/30176* (2013.01)

(58) Field of Classification Search
None
See application file for complete search history.

(56) References Cited

U.S. PATENT DOCUMENTS

| 6,816,193 B1 * | 11/2004 | Kohashi et al. ............... 348/234 |
| 7,576,894 B2 * | 8/2009 | Huang ................. H04N 1/4092 358/2.1 |
| 2003/0184659 A1 * | 10/2003 | Skow ..................... H04N 5/235 348/223.1 |
| 2005/0168644 A1 * | 8/2005 | Demas .................. H04N 9/646 348/630 |
| 2006/0187246 A1 * | 8/2006 | Miyagi ............................ 347/5 |

FOREIGN PATENT DOCUMENTS

| CN | 101059939 A | 10/2007 |
| CN | 101472113 A | 7/2009 |
| JP | 2006-340144 A | 12/2006 |

OTHER PUBLICATIONS

Feb. 28, 2015 Chinese Office Action in corresponding Chinese Patent Application No. 201310311277.1.

* cited by examiner

*Primary Examiner* — Eueng-Nan Yeh
(74) *Attorney, Agent, or Firm* — Fitzpatrick, Cella, Harper & Scinto

(57) ABSTRACT

Edge enhancement processing is performed for the luminance of each pixel of an image, and the correction value of the pixel after the edge enhancement processing is decided according to the saturation of each pixel of the image. The value of the pixel after the edge enhancement processing is corrected using the decided correction value.

11 Claims, 6 Drawing Sheets

IMAGE PROCESSING APPARATUS AND IMAGE PROCESSING METHOD WITH EDGE ENHANCEMENT

BACKGROUND OF THE INVENTION

1. Field of the Invention

The present invention relates to an image processing apparatus for performing edge enhancement processing, and an image processing method.

2. Description of the Related Art

Conventionally, edge enhancement processing can increase the readability of a character image or the sharpness of a photo, thereby improving the image quality. For the edge enhancement processing, convolution calculation by a filter is generally used. An expected output is an image having a high contrast near an edge. More specifically, by converting a bright portion to have a higher brightness and a dark portion to have a lower brightness at a position where the bright portion and the dark portion contact each other, their boundary portion is enhanced, and thus the image looks sharper.

A number of techniques have been proposed as a technique of performing edge enhancement processing for a color image. For example, there is provided a technique of increasing the readability by determining black characters in a scanned document image, performing edge enhancement for portions determined as the black characters, and generating the black characters by black ink in printing.

Japanese Patent Laid-Open No. 2006-340144 describes a technique of performing edge enhancement processing by detecting the pixels of an edge portion within a character line drawing region, and generating a density gradient for respective pixels so that the density of a pixel of an inter-edge portion sandwiched between the detected pixels of the edge portions becomes lower than that of a pixel of the edge portion.

In the above conventional example, however, general edge enhancement processing may generate an unnatural boundary. If, for example, a character or line with a significantly high saturation is drawn in the background with a different color, the color of the edge of the character or line changes by edge enhancement. As a result, the contrast of a boundary portion increases but the portion has an unnatural edge. More specifically, a bright red character is edged with dark red. Such image often has a sufficient sharpness without performing strong edge enhancement processing. Furthermore, even if the amount of enhancement is suppressed, the image quality is often high enough.

To the contrary, if a dark character or line is drawn in the background with a low saturation such as a light gray, edge enhancement processing causes an unprinted portion in a portion where the light gray background is adjacent to the character. It is necessary to suppress the amount of enhancement for such image to prevent an unprinted portion.

If edge enhancement is suppressed so as not to produce an adverse effect, as described above, it is often difficult to obtain a sufficient amount of enhancement for an image in which an edge should be enhanced.

SUMMARY OF THE INVENTION

The present invention provides an apparatus and a method for correcting the values of pixels after edge enhancement processing according to the saturation of an image.

According to one aspect of the present invention, there is provided an image processing apparatus comprising: an edge enhancement processing unit configured to perform edge enhancement processing for each pixel of an image; a decision unit configured to decide, according to a saturation of each pixel of the image, a correction value of the pixel processed by the edge enhancement processing unit; and a correction unit configured to correct a value of the processed pixel using the correction value decided by the decision unit.

According to another aspect of the present invention, there is provided an image processing apparatus comprising: a processing unit configured to perform, in an edge portion including a pixel with a first luminance and a pixel with a second luminance higher than the first luminance in an image, edge enhancement processing for the pixel with the second luminance by an amount of enhancement smaller than that of the pixel with the first luminance; and an output unit configured to output the image having undergone the edge enhancement processing by the processing unit, wherein the processing unit performs the edge enhancement processing for a pixel, of the image, with a saturation lower than a predetermined threshold.

According to still another aspect of the present invention, there is provided an image processing apparatus comprising: a processing unit configured to perform edge enhancement processing for a luminance of a pixel of interest of an image; and a combining unit configured to combine the luminance of the pixel of interest before the edge enhancement processing by the processing unit and the luminance of the pixel of interest after the edge enhancement processing by the processing unit using a combining ratio, wherein in a case where a saturation of the pixel of interest is lower than a first threshold and the luminance of the pixel of interest after the edge enhancement processing by the processing unit is higher than the luminance of the pixel of interest before the edge enhancement processing by the processing unit, the combining unit decreases a ratio of the luminance of the pixel of interest after the edge enhancement processing by the processing unit as the saturation of the pixel of interest is lower.

According to the present invention, it is possible to suppress an adverse effect produced by performing edge enhancement processing for an image, thereby performing edge enhancement of sufficient level.

Further features of the present invention will become apparent from the following description of exemplary embodiments (with reference to the attached drawings).

DESCRIPTION OF THE EMBODIMENTS

Modes for carrying out the present invention will be described in detail below with reference to the accompanying drawings. In the following embodiments, a digital multifunctional peripheral having a plurality of functions such as copy, print, and communication functions will be exemplified as an image forming apparatus.

[Arrangement of Image Forming Apparatus]

Figure 1:
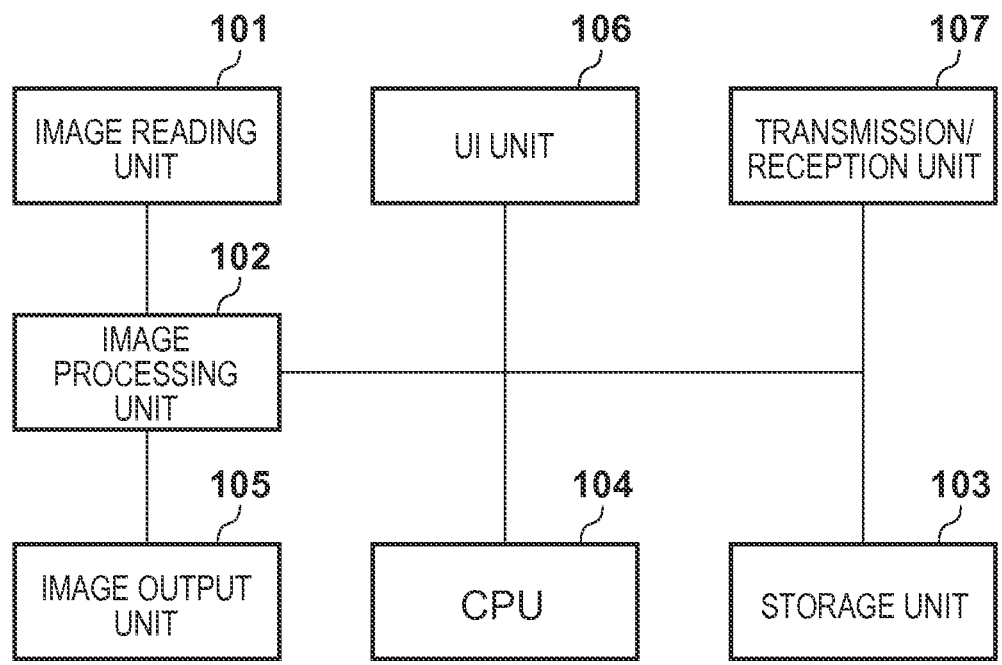
FIG. 1 is a block diagram showing an example of the arrangement of an image forming apparatus.

An example of the arrangement of an image forming apparatus according to an embodiment will be described with reference to a block diagram shown in FIG. 1. As shown in FIG. 1, the image forming apparatus includes an image reading unit 101, an image processing unit 102, a storage unit 103, a CPU 104, an image output unit 105, a UI unit 106, and a transmission/reception unit 107. Note that the image forming apparatus is connectable to a server for managing image data and a personal computer (PC) for instructing to execute printing via a network or the like.

The image reading unit 101 optically reads an image of a document and converts it into an electric signal, thereby outputting it as image data. The image processing unit 102 converts, into intermediate information (to be referred to as an "object" hereinafter), print information including image data externally input from the image reading unit 101, the transmission/reception unit 107, or the like, and stores it in the buffer of the storage unit 103. Based on the object stored in the buffer, the image processing unit 102 generates bitmap data, and stores it in the buffer of the storage unit 103. At this time, color conversion processing, edge enhancement processing, and the like are performed. Details thereof will be described later.

The storage unit 103 is formed by a ROM, a RAM, a hard disk (HDD), and the like. The ROM stores various control programs and image processing programs executed by the CPU 104. The RAM is used as a reference area or work area by the CPU 104 to store data and various kinds of information. The RAM and HDD include buffers used to, for example, store the above-described object. Furthermore, processing parameters necessary for image processing are also stored.

Image data are accumulated in the RAM or HDD, pages are sorted, and documents each including a plurality of sorted pages are accumulated, thereby printing out a plurality of copies.

The image output unit 105 forms and outputs a color image on a printing medium such as printing paper according to a print instruction. The UI unit 106 is operated to instruct a type of image processing and level adjustment in the image processing unit 102 to the apparatus. For example, the enhancement amount and the like of the above-described edge enhancement processing are set. The transmission/reception unit 107 externally receives image data for printing, and saves it in the storage unit 103 or outputs it to the image output unit 105. Furthermore, the transmission/reception unit 107 externally transmits (outputs) the image data accumulated in the storage unit 103.

[Structure of Apparatus]

Figure 2:
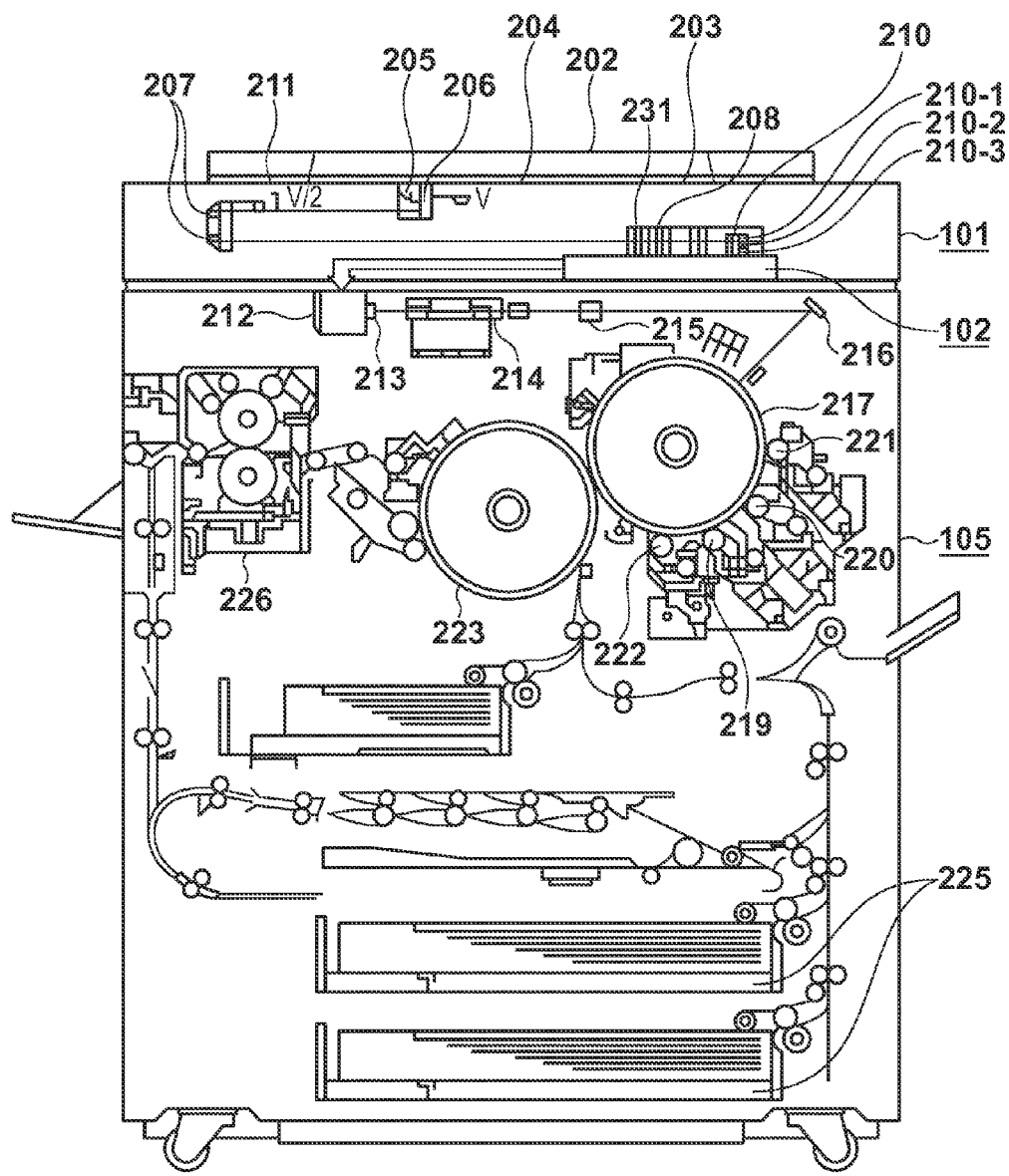
FIG. 2 is a sectional view showing the structure of the image forming apparatus.

The structure of the image forming apparatus will be described with reference to a sectional view shown in FIG. 2. In the image reading unit 101, a document 204 placed between a glass document table 203 and a document pressing plate 202 is irradiated with light of a lamp 205. Light reflected by the document 204 is guided by mirrors 206 and 207, and forms an image on a 3-line sensor 210 via a lens 208. Note that an infrared cut filter 231 is provided for the lens 208.

A motor (not shown) moves a mirror unit including the mirror 206 and lamp 205 at a velocity V in the direction of an arrow, and moves a mirror unit including the mirrors 207 at a velocity V/2 in the direction of the arrow. That is, the mirror units are moved in a direction (sub-scanning direction) perpendicular to the electrical scanning direction (main scanning direction) of the 3-line sensor 210, thereby scanning the entire surface of the document 204.

The 3-line sensor 210 including three lines of CODs color-separates input optical information to read color components of full-color information RGB (red, green, and blue), and sends the color component signals to the image processing unit 102. Note that each of the CCDs included in the 3-line sensor 210 has light-receiving elements for 5000 pixels. The 3-line sensor 210 can read a widthwise direction (297 mm) of an A3-size document, as a maximum size of a document which can be placed on the glass document table 203, at a resolution of 600 dpi.

A standard white plate 211 is used to correct data read by CCDs 210-1 to 210-3 included in the 3-line sensor 210. The standard white plate 211 is white which exhibits nearly uniform reflection characteristics under visible light.

The image processing unit 102 electrically processes an image signal input from the 3-line sensor 210 to generate color component signals of C (cyan), M (magenta), Y (yellow), and K (black), thereby sending the generated C, M, Y, and K color component signals to the image output unit 105. Image signals output at this time are C, M, Y, and K image signals which have undergone halftone processing such as dithering.

In the image output unit 105, the C, M, Y, or K image signal received from the image reading unit 102 is sent to a laser driver 212. The laser driver 212 modulates and drives a semiconductor laser element 213 according to the input image signal. A laser beam output from the semiconductor laser element 213 scans a photosensitive drum 217 via a polygonal mirror 214, f-θ lens 215, and mirror 216, thereby forming an electrostatic latent image on the photosensitive drum 217.

Developers include a magenta developer 219, a cyan developer 220, a yellow developer 221, and a black developer 222. The four developers are alternately brought into contact with the photosensitive drum 217 to develop an electrostatic latent image formed on the photosensitive drum 217 with a toner of a corresponding color, thereby forming a toner image. A printing sheet fed from a printing paper cassette 225 is wound around a transfer drum 223, and thus each toner image on the photosensitive drum 217 is transferred onto the printing sheet. The printing sheet on which the toner images of four colors C, M, Y, and K have been sequentially transferred passes through a fixing unit 226, and thus the toner images are fixed, thereby discharging the printing sheet outside the apparatus.

First Embodiment

Figure 3:
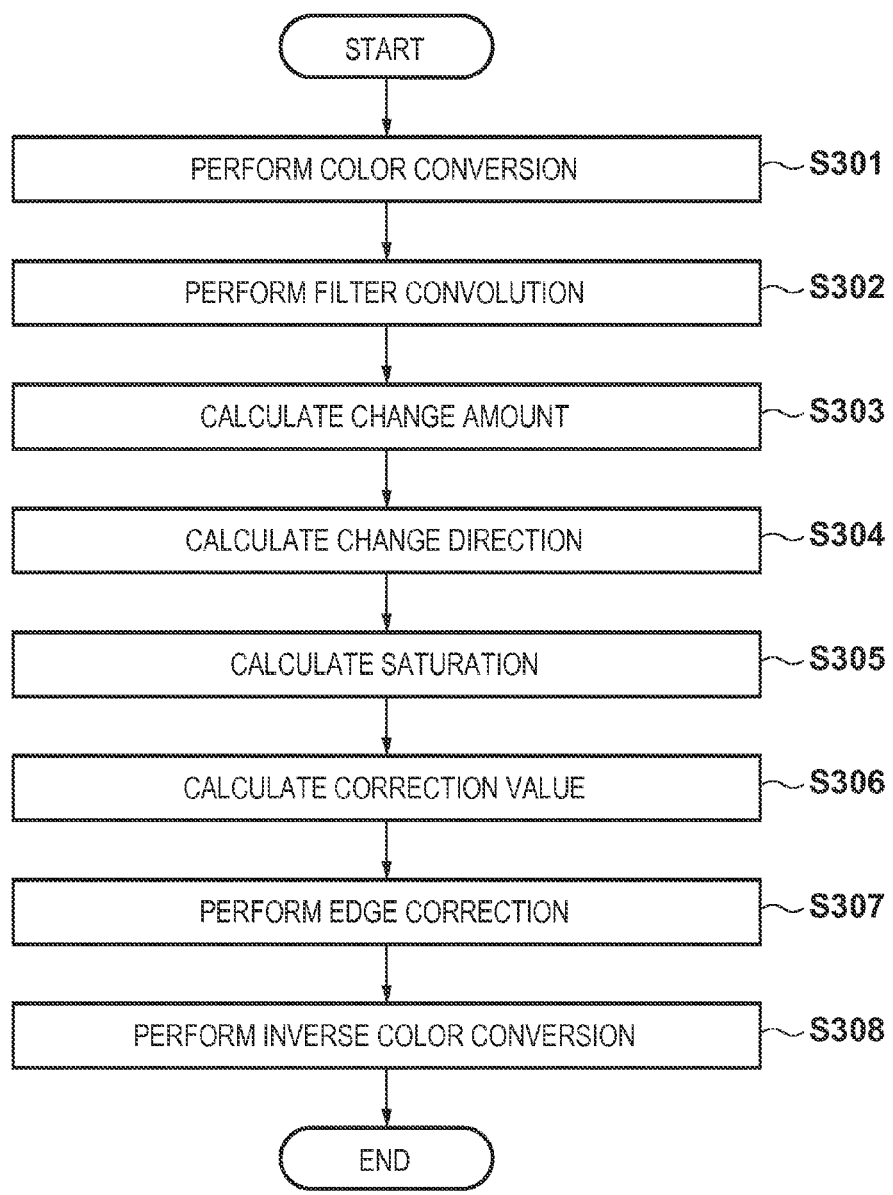
FIG. 3 is a flowchart illustrating edge enhancement processing according to the first embodiment.

Edge enhancement processing for an image in a characteristic image processing unit 102 according to the present invention will be described in detail with reference to a flowchart shown in FIG. 3. The processing shown in FIG. 3 is executed by the image processing unit 102 for each pixel in response to an instruction from a CPU 104.

In step S301, the image processing unit 102 performs color conversion processing for an input RGB image, thereby color-converting it into that of a color system (color space) of a luminance and color difference, in this example, the YCbCr color system. The color conversion equations are:

$$Y=0.2990*R+0.5870*G+0.1140*B$$

$$Cb=-0.1687*R-0.3313*G+0.5000*B$$

$$Cr=0.5000*R-0.4187*G-0.0813*B \qquad (1)$$

If the signal of the input RGB image is an 8-bit signal, its signal value falls within the range from 0 to 255, and is converted into a luminance Y (0 to 255), a color difference Cb (−128 to 127), and a color difference Cr (−128 to 127) by the above equations. This conversion processing separates the input RGB image into the luminance Y and the color differences Cb and Cr.

In step S302, the image processing unit 102 performs filter convolution for the signal of the luminance Y color-converted in step S301, thereby executing edge enhancement processing. As a general method, a second order differential is calculated using a four-way Laplacian filter, and is subtracted from an original image. To realize the edge enhancement processing by one convolution operation, it is only necessary to use, for example, the following filter matrix.

$$\begin{bmatrix} 0 & -1 & 0 \\ -1 & 5 & -1 \\ 0 & -1 & 0 \end{bmatrix}$$

This processing is performed for only the luminance Y, and is not performed for the color differences Cb and Cr. As a result, only the brightness is enhanced, and a change in color of the edge portion can be suppressed to some extent. A luminance signal obtained by the processing after the edge enhancement processing will be referred to as a luminance Y' hereinafter.

Figure 4:
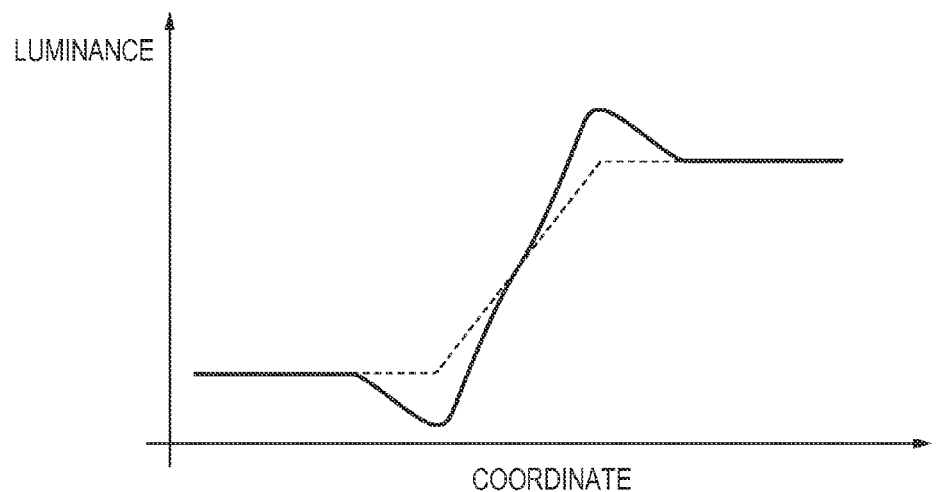
FIG. 4 is a two-dimensional graph showing a change in luminance.

FIG. 4 is a two-dimensional graph showing a change in luminance as a result of the processing. Referring to FIG. 4, a broken line represents the value of the input luminance Y, and a solid line represents the value of the luminance Y' after the edge enhancement processing. As shown in FIG. 4, the edge enhancement processing changes the luminance so that the dark side becomes darker and the bright side becomes brighter, thereby increasing the contrast. If, however, the luminance is enhanced too much in the up direction in the graph, the brightness reaches a maximum value, resulting in an unprinted portion.

In step S303, the image processing unit 102 compares the value of the luminance Y' after the edge enhancement processing obtained in step S302 with the value of the input luminance Y, thereby obtaining a change amount ΔY. In this processing, the value of the input luminance Y is simply subtracted from the value of the luminance Y' after the edge enhancement processing. The change amount ΔY is a signed value.

$$\Delta Y = Y' - Y \qquad (2)$$

In step S304, the image processing unit 102 holds the sign of the change amount ΔY obtained in step S303. If the sign is positive, the brightness has increased with respect to the input. On the other hand, if the sign is negative, the brightness has decreased with respect to the input. Note that if the brightness increases too much, an unprinted portion may occur. On the other hand, if the brightness decreases too much, the color may darken.

In step S305, the image processing unit 102 calculates a saturation S using the color differences Cb and Cr obtained in step S301. As described above, the color differences Cb and Cr correspond to color components, and a distance from (Cb, Cr)=(0, 0) represents the sharpness. Therefore, the saturation S is obtained by:

$$S = \sqrt{Cb^2 + Cr^2} \qquad (3)$$

In step S306, the image processing unit 102 calculates a correction value for controlling the amount of edge enhancement based on the saturation S obtained in step S305 and the sign obtained in step S304. Let α be the correction value which assumes a value from 0 to 1. As the correction value gets closer to 1, edge enhancement becomes stronger. As described above, an adverse effect on the image after the edge enhancement processing changes depending on the sign of the change amount ΔY, and thus the calculation method is switched according to the sign.

Figure 5A:
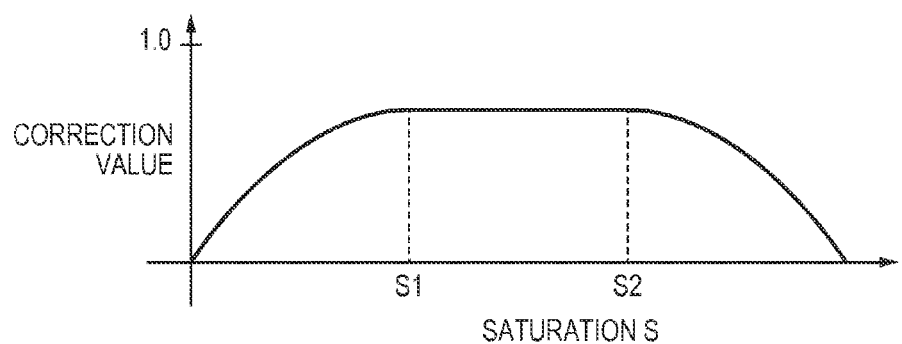
FIG. 5A is a graph showing the relationship between a correction value and a saturation when the luminance change has a positive sign.

FIG. 5A is a graph showing the relationship between the saturation S and the correction value α if the sign is positive (a pixel of interest has become brighter). If the edge enhancement processing changes a high-saturation region to be brighter, a change in color is noticeable. If the edge enhancement processing changes a low-saturation region to be brighter, the low-saturation region becomes whiter, and is noticeable. To solve these problems, in a high-saturation region higher than a saturation S2 (a second threshold) shown in FIG. 5A, the correction value α is converged to 0 to minimize a change in color. On the other hand, in a low-saturation region lower than a saturation S1 (a first threshold), the correction value α is converged to 0 so as not to cause an unprinted portion. By setting the correction value α to a value smaller than 1.0 in a middle saturation region, it becomes possible to suppress a change in color and an unprinted portion as a result of edge enhancement for all saturation regions.

Figure 5B:
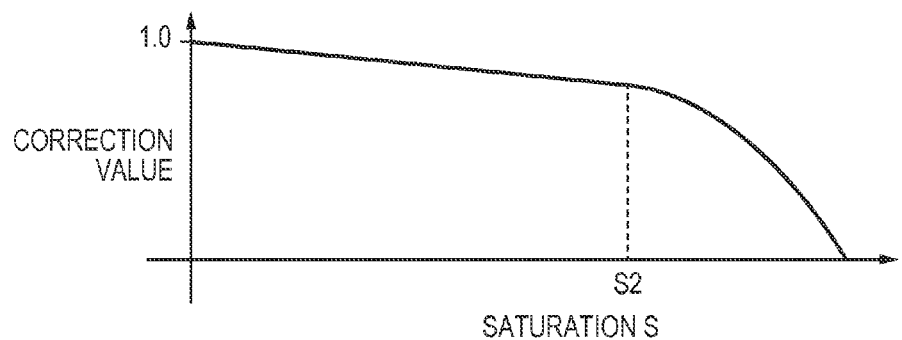
FIG. 5B is a graph showing the relationship between a correction value and a saturation when the luminance change has a negative sign.

On the other hand, FIG. 5B is a graph showing the relationship between the saturation S and the correction value α if the sign is negative (a pixel of interest has become darker). If the edge enhancement processing changes a high-saturation region to be darker, a change in color is noticeable. Therefore, as in the case in which the high-saturation region is changed to be brighter, in a high-saturation region higher than the saturation S2 (a third threshold), the correction value α is converged to 0. On the other hand, if the edge enhancement processing changes a low-saturation region to be darker, a change in color is not noticeable. Therefore, in a low-saturation region lower than the saturation S2, the correction value α is linearly changed toward 1.0. That is, if the edge enhancement processing changes the high-saturation region to be darker, it is suppressed. If, however, the edge enhancement processing changes the low-saturation region to be darker, it is not suppressed.

The correction value α is decided in this manner. Instead of a calculation equation, this processing uses an LUT (lookup table) for which the value of the saturation S is used as an input. That is, the correction value α is obtained using one of two LUTs corresponding to the sign (positive or negative) of the change amount ΔY.

Note that the LUTs are stored in a storage unit 103, and loaded during the processing. In this example, an LUT in which the correction value α continuously changes depending on the value of the saturation S has been explained. As a simpler implementation method, threshold processing of, for example, decreasing the correction value α when the saturation S exceeds a given value is possible. However, when this method is used for a gradation image in which the saturation S gradually changes, the degree of edge enhancement is switched at a given position, which is unwantedly visible. To solve this problem, it is necessary to continuously change the correction value α depending on a change in the saturation S, and thus the above-described control operation is performed.

In step S307, the image processing unit 102 corrects the amount of edge enhancement based on the edge enhancement correction value α calculated in step S306, the luminance Y' obtained in step S302, and the luminance Y obtained in step S301, thereby obtaining a final luminance Y". The final luminance Y" is obtained by linear interpolation using:

$$Y''=(1.0-\alpha)*Y+\alpha*Y' \quad (4)$$

Figure 6:
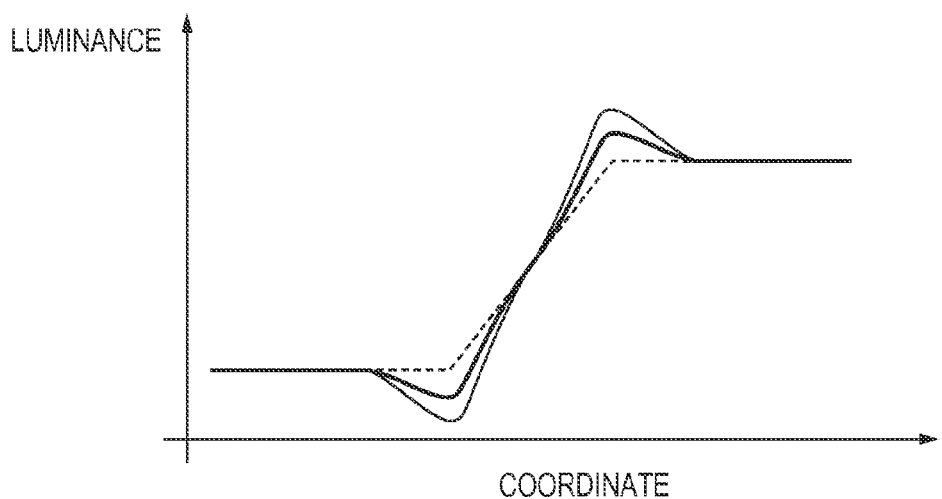
FIG. 6 is a graph showing an output when a luminance changes as shown in FIG. 4 and a correction value α is 0.5.

In this calculation, the maximum value of the correction value α is 1.0. An output is therefore obtained by alpha-blending the two signals of the luminances Y and Y'. FIG. 6 shows an output when the luminance changes as shown in FIG. 4 and the correction value α is 0.5. Referring to FIG. 6, a thick line represents a result obtained by alpha-blending. It is apparent from FIG. 6 that the amount (degree) of edge enhancement is suppressed. This control operation is switched depending on the saturation region and the change direction, thereby achieving preferred edge enhancement.

In step S308, the image processing unit 102 performs inverse color conversion for YCbCr data for which the amount of edge enhancement has been corrected in step S307, thereby obtaining R'G'B' data. This processing calculates the inverse matrix of the matrix of the color conversion performed in step S301. The following calculation equations are used.

$$R'=Y''+1.4020*Cr$$

$$G'=Y''-0.3441*Cb-0.7141*Cr$$

$$B'=Y''+1.7720*Cb \quad (5)$$

The above-described processing makes it possible to obtain an edge-enhanced RGB color image without any significant unprinted portion in a relatively bright gray region or any problem caused by high-saturation character boundaries.

Note that the YCbCr color system is used in the first embodiment. The present invention, however, is applicable to any other luminance-color difference systems such as the Lab color system. A method of performing edge enhancement is not limited to the above-described one, and an unsharp mask or the like may be used.

On the other hand, for an image which has been obtained by performing edge enhancement for an input image and in which an edge portion has been unnaturally edged or an unprinted portion has occurred, the present invention is also applicable to weaken the edge, thereby blurring the image. In this case, in terms of removal of the adverse effects, the correction value α is set differently from edge enhancement. That is, to blur the edge in a high-saturation region, the correction value α is increased as the saturation is higher. Similarly, if an unprinted portion is to be blurred, the correction value α is increased to change a low-saturation region to be darker; otherwise, the correction value α is decreased to suppress a luminance change.

Second Embodiment

In the first embodiment, processing is executed by applying a uniform filter matrix and correction value for the whole image. If the attribute of an image such as a character image, a photo image, or a vector graphic image is known in advance, a correction value appropriate to the attribute can be applied to improve the image quality. In addition to the attribute of the image, the user can designate a preferred level of edge enhancement through the UI unit, and then the amount of edge enhancement is controlled based on the designated level, thereby widening the adjustment width.

In the second embodiment, an arrangement for controlling the amount of edge enhancement by changing a filter matrix and correction value according to the level of edge enhancement designated by the user will be described. Note that the arrangement and structure of an image forming apparatus are the same as those shown in FIGS. 1 and 2 described in the first embodiment, and a repetitive description thereof will be omitted. Edge enhancement coefficient calculation processing as a point will be explained.

Figure 7:
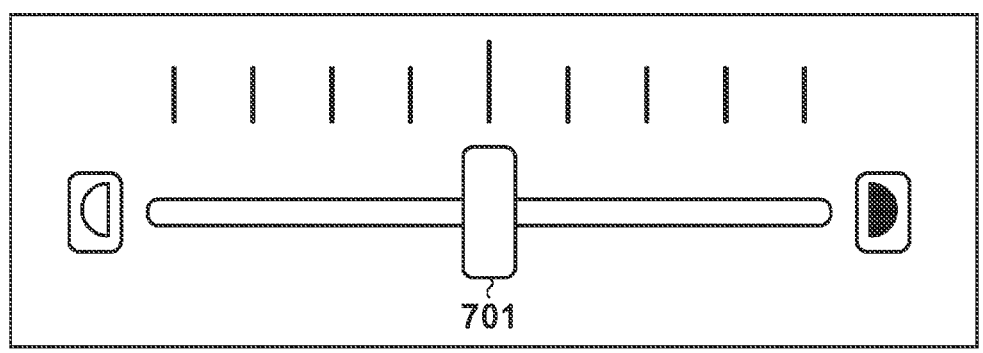
FIG. 7 is a view showing an example of the arrangement of a UI unit for designating an edge enhancement level.

An example of the arrangement of the UI unit for designating the edge enhancement level according to the second embodiment will be described with reference to FIG. 7. In the example shown in FIG. 7, the user can designate the level of edge enhancement using a slide bar 701. The user can control to increase the level of edge enhancement by moving the slide bar 701 to the right and to decrease the level of edge enhancement by moving the slide bar 701 to the left. Furthermore, the designated level is temporarily stored in a storage unit 103. Parameters for edge enhancement processing are changed by referring to the level. Note that the parameters are the coefficients of a filter matrix and the amount (degree) of edge enhancement according to the saturation. The level negatively changes from the normal state toward the left, and positively changes from the normal state toward the right. In the example shown in FIG. 7, there are four levels of adjustment width in the negative and positive directions, respectively.

More specifically, the coefficients of the filter matrix used in step S302 of FIG. 3 and the correction value used in step S306 are changed to change the degree of edge enhancement. These parameters are changed based on the edge enhancement setting value set through a UI unit 106 and held in the storage unit 103. If a negative setting value, that is, relatively weak edge enhancement is selected, the convolution coefficients of the filter used in step S302 described in the first embodiment are equally multiplied by a value smaller than 1. For example, multiplication by 0.8 yields:

$$\begin{bmatrix} 0 & -0.8 & 0 \\ -0.8 & 4.0 & -0.8 \\ 0 & -0.8 & 0 \end{bmatrix}$$

If convolution is performed in this state, the gain decreases, and all the values are small, thereby darkening the image. To prevent this, the central coefficient of 4.0 is offset so that the sum of the matrix becomes 1.0. In this example, the coefficient is offset by 0.2 to obtain a coefficient of 4.2, and the sum becomes 1.0. This calculation makes it possible to obtain coefficients for weaker edge enhancement. In addition, edge enhancement is weakened by multiplying the correction value α of the LUT used in step S306 by a value smaller than 1.

On the other hand, if a positive setting value, that is, relatively strong edge enhancement is selected, the coefficients are multiplied by a value larger than 1. Similarly to the negative setting value, the central coefficient is offset so that the sum becomes 1.0, thereby obtaining coefficients for stronger edge enhancement. The same goes for the correction value α used in step S306.

The above-described processing corresponds to increasing/decreasing the central weight in convolution. As the surrounding weights increase, the edge is enhanced heavily. To the contrary, as the central weight increases, the degree of edge enhancement reduces.

As described above, it is possible to change the edge enhancement level by performing simple calculation for the filter matrix and correction value.

Note that in the second embodiment, the level of edge enhancement is switched according to the setting value designated through the UI unit 106. However, the level of edge enhancement may be switched depending on the attribute of the image. Since, for example, a photo image has few edges with a significantly high saturation, it is possible to perform strong edge enhancement without the need to perform correction with the correction value α so many times. On the other hand, a graphic or character image tends to have high-saturation characters, lines, and the like, and a problem associated with visible boundaries or an unprinted portion may occur more significantly than a photo image. It is almost unnecessary to perform strong edge enhancement for such image. Therefore, if the attribute of the image indicates a graphic or character image, weak edge enhancement can be performed.

Third Embodiment

In the first and second embodiments, the difference between the output resolution of the transmission/reception unit 107 or image output unit 105 and a resolution at which edge enhancement processing is performed has not been described. The degree of edge enhancement largely changes depending on the difference between a processing resolution and an output resolution. If, for example, a low-resolution image undergoes strong edge enhancement, and is then enlarged and output, boundaries are more perceivable, and the whole image is noisy. To the contrary, if a high-resolution image undergoes relatively weak edge enhancement, it is almost impossible to obtain the effects in many cases.

According to the third embodiment, it is possible to switch the level of edge enhancement depending on the output resolution and the input resolution. Note that the arrangement and structure of an image forming apparatus are the same as those shown in FIGS. 1 and 2 described in the first embodiment, and a repetitive description thereof will be omitted. The edge enhancement coefficient calculation processing described in the second embodiment will be exemplified.

An image reading unit 101 generally uses a fixed resolution or several resolutions within the device, and reads an image at a relatively high resolution such as 600 dpi. This resolution is necessary for correctly resolving a character image or the like. Similarly, an image output unit 105 generally prepares a fixed resolution or several resolutions for printing out within the device.

If, however, the apparatus is connected to an external apparatus via a network or the like, image data received via a transmission/reception unit 107 may be image data of various resolutions depending on original data in a transmission source. An image processing unit 102 performs enlargement or reduction processing for the image data to obtain a resolution for printing out. As described above, strong edge enhancement processing is performed for the received image data with a low resolution, and weak edge enhancement processing is performed for the received image data with a high resolution, thereby producing an adverse effect.

In the third embodiment, an arrangement for scaling the resolution to an output resolution after performing edge enhancement processing will be described. The processing order is not limited to that to be explained.

In the second embodiment, processing of changing the level of edge enhancement by changing the coefficients of the filter matrix used in step S302 and the correction value used in step S306 is executed by converting the setting value by the UI unit 106. Similar processing is performed in the third embodiment. However, processing of changing an edge enhancement setting value based on information indicating the resolution of the received image data instead of the setting value set through a UI unit 106 will be described.

As described in the second embodiment, different effects are obtained depending on whether the coefficients of the filter matrix in step S302 and the correction value in step S306 are multiplied by a value larger or smaller than 1.0. A multiplier β for resolution information is held in a storage unit 103 as a table, and the coefficients of the filter matrix and the correction value are converted by referring to the table.

Figure 8:
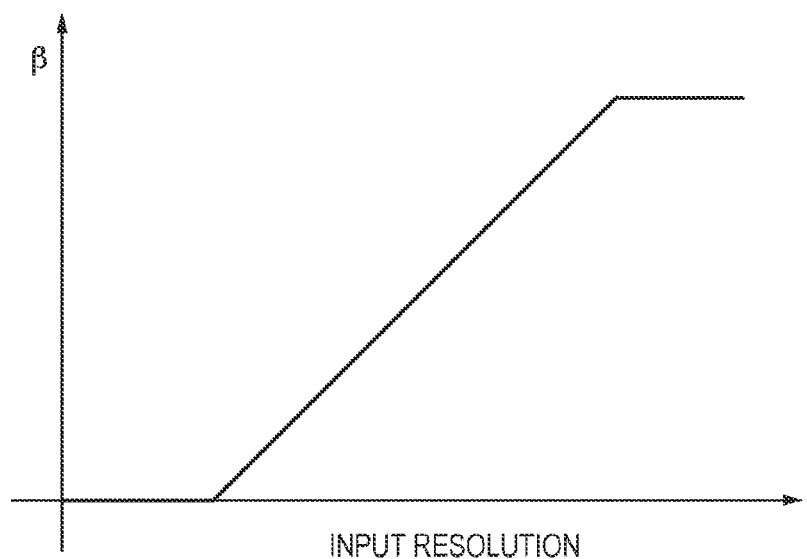
FIG. 8 is a graph showing an example of a table for conversion of the coefficients of a filter matrix and a correction value.

FIG. 8 shows an example of a table for converting the coefficients of the filter matrix and the correction value according to the third embodiment. According to the table, as the input resolution becomes higher, the multiplier β increases. If the resolution becomes smaller than a given resolution, the multiplier β converges to 0. In this case, since the multiplier β is 0, the result obtained corresponds to the input resolution which has not undergone the processing. For example, if edge enhancement is performed for an image which is enlarged to 60 times such that the input resolution is 10 dpi and the output resolution is 600 dpi, the width of the enhanced edge becomes wider, thereby causing a big problem associated with the image quality. If the resolution is too low, therefore, the multiplier β is converged to 0.

On the other hand, it is necessary to perform very strong edge enhancement for a high input resolution. If, however, the edge is enhanced too much, a difference in color occurs. In this case as well, at a resolution higher than a specific resolution, the multiplier β is converged to 0.

By performing processing of obtaining the input resolution and the multiplier β shown in the table for the filter matrix and correction value, it becomes possible to execute optimum edge enhancement image processing for the input resolution.

Note that in the third embodiment, a description of processing of switching the level of edge enhancement according to the setting value set through the UI unit 106 has been omitted. However, processing similar to that in the second embodiment can be executed by further multiplying the multiplier β by a level switching coefficient based on the UI setting value, and calculating the coefficients of the filter matrix and the correction value based on both the input resolution and the UI setting value.

Fourth Embodiment

In the first to third embodiments, an RGB image as a luminance signal has been exemplified as an input image. It is also possible to process a CMYK image as an ink density signal. In the fourth embodiment, processing of correcting the amount of edge enhancement will be described by exemplifying a CMYK image as an input image. Note that the arrangement and structure of an image forming apparatus are the same as those shown in FIGS. 1 and 2 described in the first embodiment, and a repetitive description thereof will be omitted.

Figure 9:
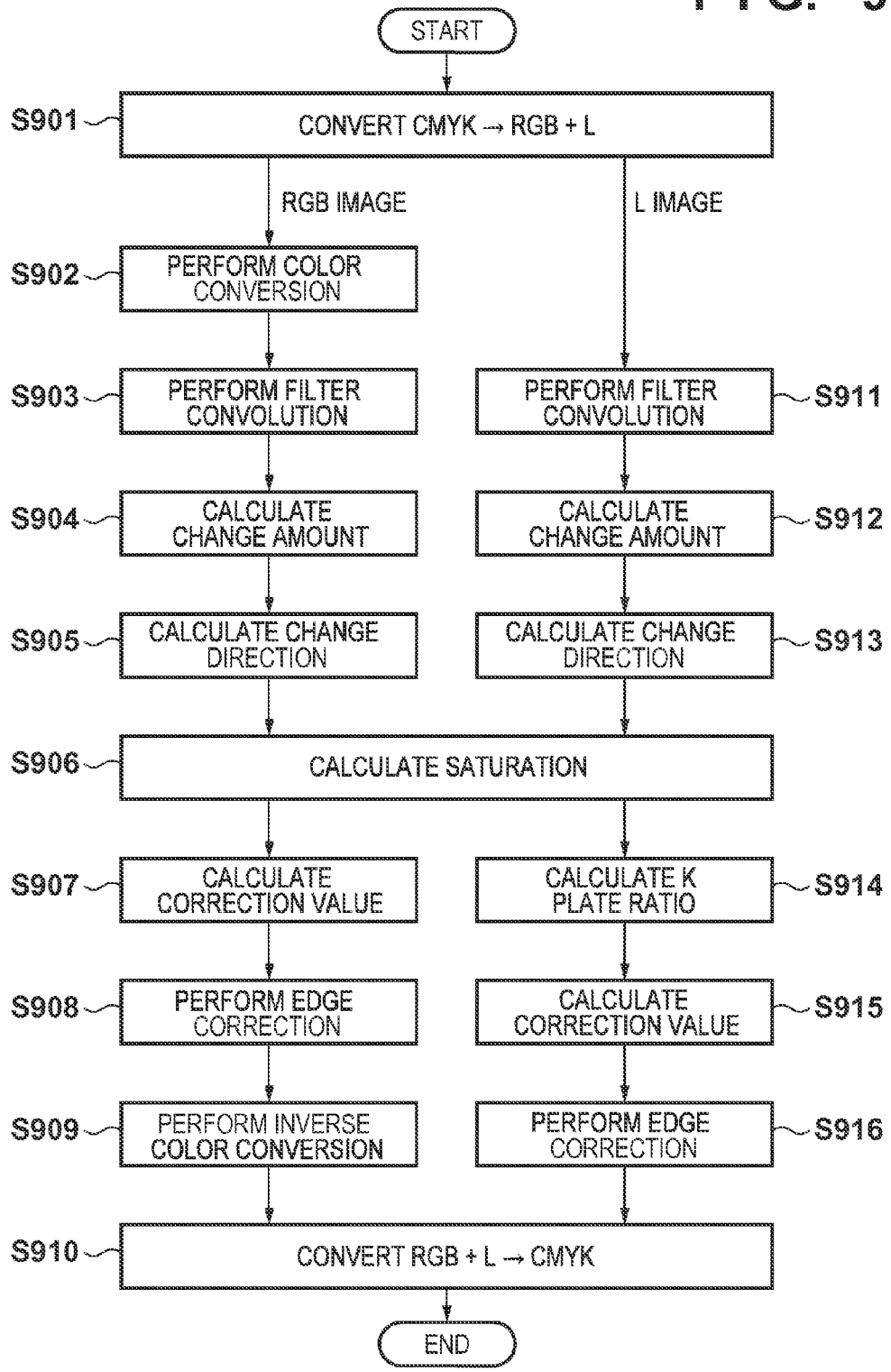
FIG. 9 is a flowchart illustrating edge enhancement processing according to the fourth embodiment.

Edge enhancement processing executed for an image by an image processing unit 102 according to the fourth embodiment will be described in detail with reference to a flowchart shown in FIG. 9. Note that processing in steps S902 to S909 shown in FIG. 9 is the same as that in steps S301 to S308 shown in FIG. 3 described in the first embodiment, and a description thereof will be omitted. The processing shown in FIG. 9 is executed by the image processing unit 102 in response to an instruction by a CPU 104, as in the first embodiment.

In step S901, the image processing unit 102 separates an input CMYK image into a CMY image and a K image, and converts the CMY image into an RGB image, and the K image into an L (luminance) image. More specifically, the conversion processing is performed using:

$$R = 255 - C$$

$$G = 255 - M$$

$$B = 255 - Y$$

$$L = 255 - K \quad (6)$$

This calculation operation is performed on the assumption that the C, M, Y, and K data are 8-bit signal data of 256 tones, respectively. The RGB image undergoes the processing in steps S902 to S909, and is converted into an R'G'B' image after edge enhancement processing.

Along with this processing, processing in steps S911 to S916 obtained by excluding color conversion in step S902 and inverse color conversion in step S909 from the processing executed for the RGB image is performed for the L image (luminance image), as shown in FIG. 9. The color conversion and inverse color conversion processes are omitted because they are impossible using only the L signal.

The processing in steps S911 to S913 is the same as that in steps S903 to S905 for the RGB image. Since it is impossible to calculate a saturation based on the L image in step S906, the saturation obtained based on the RGB image is used to calculate the correction value of the L image in step S915.

In step S914, the ratio of K color (K plate or K component) to CMY is obtained. An unprinted portion is more noticeable in an image (100% GCR image) in which black is represented by only the K plate than in an image in which black is represented by four colors of C, M, Y, and K. For an image in which black is represented by four colors of C, M, Y, and K, even though edge enhancement for the K plate causes an unprinted portion, other three colors of C, M, and Y fill the blown-out highlight, thereby making the unprinted portion less visible. Therefore, if black is represented by only the K plate and the black ratio is high, the correction value is set to decrease the degree of edge enhancement. On the other hand, if black is represented by the four colors, the correction value is set to increase the degree of edge enhancement.

Similarly to step S908, in step S915, the edge enhancement correction value is calculated based on the K color ratio calculated in step S914 in addition to the edge change amount, edge change direction, and saturation. In step S916, edge enhancement correction is performed using the correction value obtained as a result of the above processes, thereby obtaining an L' image after edge enhancement processing.

In step S910, the image processing unit 102 inversely converts the R'G'B' image obtained in step S909 and the L' image obtained in step S916 into a CMYK image. More specifically, the image processing unit 102 inversely converts the images using:

$$C = 255 - R'$$

$$M = 255 - G'$$

$$Y = 255 - B'$$

$$K = 255 - L' \quad (7)$$

With this arrangement, it is possible to perform preferred edge enhancement processing for a CMYK input image, similarly to the RGB input image described in the above embodiments. There are also other methods of converting a CMYK image into an RGB image. For example, it is possible to perform edge enhancement processing using:

$$R = 255 - \mathrm{Min}(255, C+K)$$

$$G = 255 - \mathrm{Min}(255, M+K)$$

$$B = 255 - \mathrm{Min}(255, Y+K) \quad (8)$$

Other Embodiments

The present invention is also realized by executing the following processing. That is, the present invention is realized by supplying software (a program) which implements the functions of the above-described embodiments to a system or apparatus via a network or various storage media, and reading out and executing the program by the computer (or CPU or MPU) of the system or apparatus.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-163073, filed Jul. 23, 2012, which is hereby incorporated by reference herein in its entirety.

What is claimed is:

1. An image processing apparatus comprising:
a processing unit including at least a processor and configured to perform, in an edge portion including a pixel with a first luminance and a pixel with a second luminance higher than the first luminance in an image, edge enhancement processing for the pixel with the second luminance by an amount of enhancement smaller than that of the pixel with the first luminance; and
an output unit configured to output the image having undergone the edge enhancement processing by said processing unit,
wherein said processing unit performs the edge enhancement processing for a pixel, of the image, with a saturation lower than a predetermined threshold.

2. The apparatus according to claim 1, wherein as a saturation of a pixel with a saturation lower than the predetermined threshold is lower, the amount of enhancement is made smaller.

3. An image processing method comprising:
automatically performing, in an edge portion including a pixel with a first luminance and a pixel with a second luminance higher than the first luminance in an image, edge enhancement processing for the pixel with the second luminance by an amount of enhancement smaller than that of the pixel with the first luminance; and outputting the image having undergone the edge enhancement processing, wherein the edge enhancement processing is performed for a pixel, of the image, with a saturation lower than a predetermined threshold.

4. A non-transitory computer-readable medium storing a computer program for causing a computer to execute a method, the method comprising:

automatically performing, in an edge portion including a pixel with a first luminance and a pixel with a second luminance higher than the first luminance in an image, edge enhancement processing for the pixel with the second luminance by an amount of enhancement smaller than that of the pixel with the first luminance; and outputting the image having undergone the edge enhancement processing, wherein the edge enhancement processing is performed for a pixel, of the image, with a saturation lower than a predetermined threshold.

5. An image processing apparatus, comprising:

a processing unit configured to perform edge enhancement processing for a luminance value of a pixel of interest using luminance values of the pixel of interest and pixels surrounding the pixel of interest;

a control unit configured to suppress the edge enhancement processing for the luminance value of the pixel of interest, for which the edge enhancement processing has been processed by the processing unit, in a case (a) where the luminance value of the pixel of interest for which the edge enhancement processing has been performed by the processing unit is larger than the luminance value of the pixel of interest for which the edge enhancement processing has not been performed by the processing unit, and (b) where a saturation value of the pixel of interest is smaller than a first saturation value, the saturation value of the pixel of interest and the first saturation value indicating chromatic colors.

6. The apparatus according to claim 5, wherein the control unit is configured to suppress the edge enhancement processing for the luminance value of the pixel of interest processed by the processing unit in a case (a) where the luminance value of the pixel of interest for which the edge enhancement processing has been performed by the processing unit is smaller than the luminance value of the pixel of interest for which the edge enhancement processing has not been performed by the processing unit, and (b) where a saturation value of the pixel of interest is larger than a second saturation value, the saturation value of the pixel of interest and the second saturation value indicating chromatic colors, wherein the second saturation value is larger than the first saturation value.

7. The apparatus according to claim 6, wherein the control unit is configured to increase an amount of suppression of the edge enhancement processing as the saturation value of the pixel of interest becomes larger in a case (a) where the luminance value of the pixel of interest for which the edge enhancement processing has been performed by the processing unit is smaller than the luminance value of the pixel of interest for which the edge enhancement processing has not been performed by the processing unit, and (b) where the saturation value of the pixel of interest is larger than a second saturation value, the saturation value of the pixel of interest and the second saturation value indicating chromatic colors.

8. The apparatus according to claim 5, wherein the control unit is configured to increase an amount of suppression of the edge enhancement processing as the saturation value of the pixel of interest becomes smaller.

9. The apparatus according to claim 5, wherein the control unit is configured to suppress the edge enhancement processing for the luminance value of the pixel of interest processed by the processing unit in a case (a) where the luminance value of the pixel of interest for which the edge enhancement processing has been performed by the processing unit is larger than the luminance value of the pixel of interest for which the edge enhancement processing has not been performed by the processing unit, and (b) where the saturation value of the pixel of interest is larger than a second saturation value, the saturation value of the pixel of interest and the second saturation value indicating chromatic colors, wherein the second saturation value is larger than the first saturation value.

10. An image processing method, comprising:

performing edge enhancement processing for a luminance value of a pixel of interest using luminance values of the pixel of interest and pixels surrounding the pixel of interest;

suppressing the edge enhancement processing for the luminance value of the pixel of interest for which the edge enhancement processing has been processed in a case (a) where the luminance value of the pixel of interest for which the edge enhancement processing has been performed is larger than the luminance value of the pixel of interest for which the edge enhancement processing has not been performed, and (b) where a saturation value of the pixel of interest is smaller than a first saturation value, the saturation value of the pixel of interest and the first saturation value indicating chromatic colors.

11. A non-transitory computer-readable medium storing computer program for causing a computer to execute a method, the method, comprising:

performing edge enhancement processing for a luminance value of a pixel of interest using luminance values of the pixel of interest and pixels surrounding the pixel of interest;

suppressing the edge enhancement processing for the luminance value of the pixel of interest for which the edge enhancement processing has been processed in a case (a) where the luminance value of the pixel of interest for which the edge enhancement processing has been performed is larger than the luminance value of the pixel of interest for which the edge enhancement processing has not been performed, and (b) where a saturation value of the pixel of interest is smaller than a first saturation value, the saturation value of the pixel of interest and the first saturation value indicating chromatic colors.

* * * * *